March 30, 1943.  H. M. EVJEN  2,314,874
REVERSING SWITCH
Filed Feb. 25, 1942   2 Sheets-Sheet 1
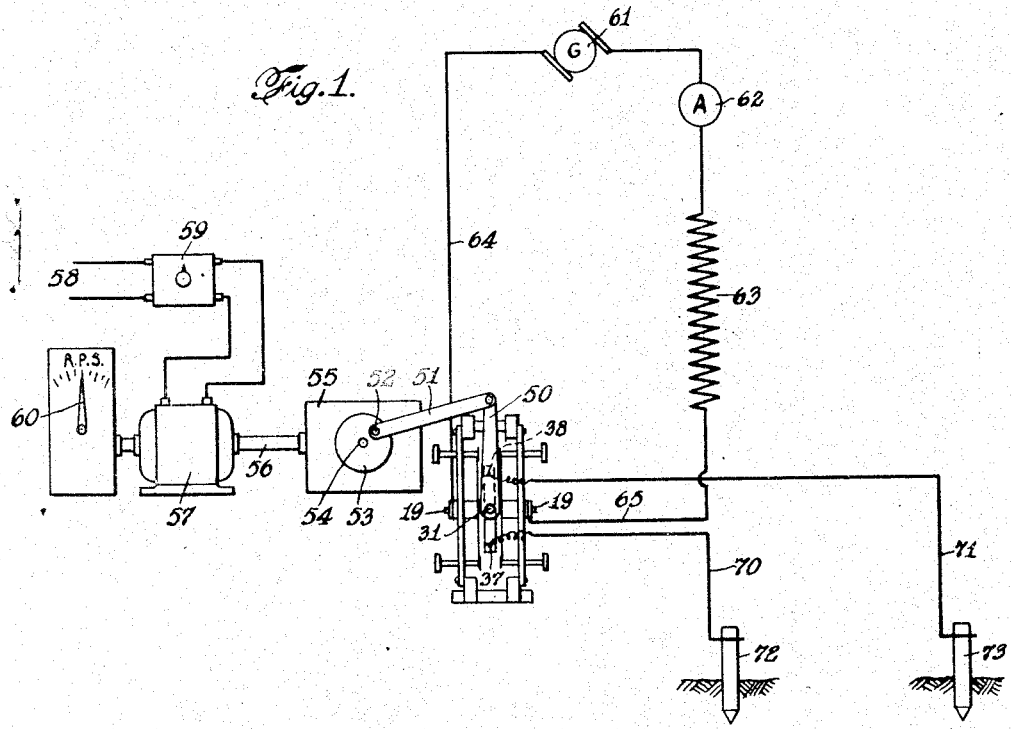
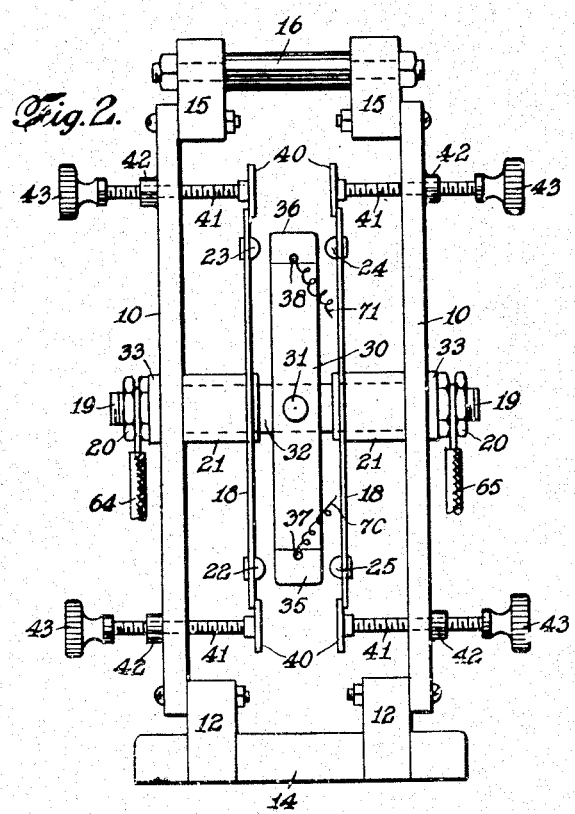
INVENTOR.
HAAKON M. EVJEN
BY
ATTORNEY.

March 30, 1943.  H. M. EVJEN  2,314,874

REVERSING SWITCH

Filed Feb. 25, 1942  2 Sheets-Sheet 2

INVENTOR.
HAAKON M. EVJEN
BY
ATTORNEY.

Patented Mar. 30, 1943

2,314,874

UNITED STATES PATENT OFFICE 2,314,874

REVERSING SWITCH

Haakon M. Evjen, Houston, Tex., assignor to Nordel Corporation, Houston, Tex., a corporation of Delaware Application February 25, 1942, Serial No. 432,176

4 Claims. (Cl. 200—23)

This invention relates to reversing switches and more particularly to a switch suited for use in geophysical exploration systems of the type shown in the application of Knute Evjen, Ser. No. 310,109 which embodies an earth current circuit including a current source and a controlled reversing means for passing a current reversed at a predetermined controlled low frequency through the earth between spaced earth electrodes, and a potential circuit including potential pick-up electrodes located at spaced points adjacent the earth's surface and lying within the field of influence of the earth current. The potential circuit is provided with a reversing switch synchronized with the first reversing switch for converting the picked-up potential into a unidirectional potential suitable for actuating a direct current measuring instrument such as a galvanometer. The earth current circuit and the potential circuit are coupled by a coupling circuit which includes means for producing a potential drop proportional to the total current flowing in the earth current circuit and for balancing a controllable portion of this potential drop against the picked-up potential so as to obtain, by a single reading, a measurement which indicates directly the earth's apparent resistivity.

An object of this invention is to provide a novel and improved reversing switch to be used in a system of the type above indicated.

Another object is to provide a reversing switch having novel and improved adjusting mechanism for varying the amount of gap or overlap at reversal.

Various other objects and advantages will be apparent as the nature of the invention is more fully disclosed.

The nature of the invention may be better understood by referring to the following description, taken in connection with the accompanying drawings in which certain specific embodiments thereof have been set forth for purposes of illustration.

In the drawings:

Fig. 1 is a schematic view showing the reversing switch embodying the present invention as applied to the earth current circuit of a geophysical exploration system of the type above referred to;

Fig. 2 is an enlarged detail view of the reversing switch;

Figure 3:
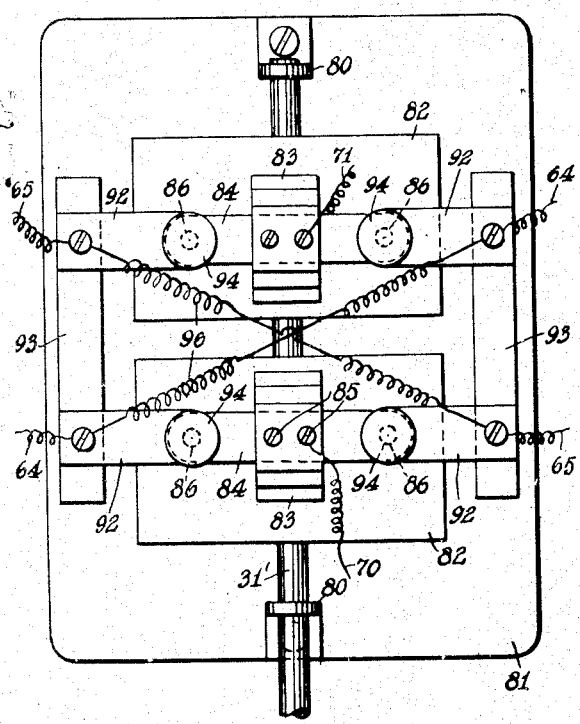
Fig. 3 is a plan view of another embodiment of the invention.

Referring first to Fig. 2, the switch is shown as comprising a pair of side plates 10 which are mounted at their lower ends on blocks 12 attached to a suitable base 14. Either the plates 10 or the blocks 12 or both may be made of insulating material. At their upper ends the plates 10 are attached to insulating blocks 15 which are secured together by a tie rod 16.

The plates 10 carry flexible leaf spring members 18 which are mounted on bolts 19 extending through said plates and secured by nuts 20. The bolts 19 are provided with spacing sleeves 21 which secure the leaf springs 18 in position. The bolts 19 form binding posts for establishing electrical connections to the springs 18. The side plates 10 may be made of conducting material with the sleeves 21 formed as bosses thereon or the plates 10 may be made of insulating material with the electrical connection established by the bolts 19. In the event that the side plates 10 are made of insulating material they may be mounted directly on the base 14 as the additional insulation provided by the blocks 12 will not be required.

The spring members 18 are provided with reversing contacts 22 to 25. The reversing member comprises a bar 30 of insulating material mounted on a shaft 31 which is journalled in a bracket 32 having ears 33 secured to the side plates 10 by nuts 20. The insulating bar 30 is provided at its ends with conducting members 35 and 36 respectively which form, in effect, movable switch blades. The contact members 35 and 36 are provided with screws 37 and 38 respectively by which connections are made thereto.

For controlling the timing of the various contacts, a plurality of stop members 40 are provided each of which is mounted on a threaded shaft 41 which is threaded in a bore 42 formed on the side plates 10 and is provided with a knurled adjusting nut 43. The stop means 40 engage the ends of the spring members 18 to limit the movement of the respective contacts 22 to 25 in a closing direction while permitting the spring members 18 to be flexed outwardly with the bar 30 when the respective contacts are engaged by the conducting members 35 and 36.

Referring to Fig. 1, the shaft 31 is shown as attached to an arm 50 which is connected by a link 51 to an eccentric pin 52 carried by a disc 53 which is attached to a rotating shaft 54. The rotating shaft 54 is connected through a gear train, enclosed within a housing 55, to the shaft 56 of an electric motor 57. The motor 57 is driven from mains 58 through a speed control device 59 and is provided with an indicator 60 to indicate the speed of operation thereof.

The earth current circuit is shown as comprising a source 61 of direct current, such as a generator or battery, connected in series circuit with an ammeter 62, a resistance 63, representing a load, and feed lines 64 and 65. The lines 64 and 65 are connected respectively to the two bolts 19 forming the binding posts for the stationary switch contacts. Lines 70 and 71 are connected by screws 37 and 38 to the contact members 35 and 36 respectively. The lines 70 and 71 lead to suitable ground electrodes 72 and 73 respectively which are spaced a convenient distance apart and, when the reversing switch is operated in the manner to be described, pass through the earth circuit an alternating current having a frequency corresponding to the speed of operation of said switch. This current may be measured by the ammeter 62 and may be adjusted within desired limits by suitable regulation of the source 61. The frequency of this earth current may be controlled by controlling the speed of the motor 57 by means of the regulator 59 and may be determined by the indicator 60.

Operation of the motor 57 causes a corresponding rotational movement of the disc 53 and through the link 51, a rocking movement of the shaft 31 and of the contact bar 30 which is carried thereby. Rocking movement of the bar 30 in one direction causes the contacts 35 and 36 to engage contacts 25 and 23 and, in the other direction, causes contacts 35 and 36 to engage contacts 22 and 24, thereby reversing the connection between the lines 64 and 65 and the lines 70 and 71.

The timing of the closing and opening of the two sets of contacts may be adjusted by means of the adjustable stops 40. The stops may be adjusted to provide gaps between the opening and closing of the two sets of contacts, or if desired an overlap may be provided by so adjusting the stops that the contacts 24 and 22, for example, close before the contacts 23 and 25 open. In the prospecting system shown in the Knute Evjen application above mentioned, for example, the reversing switch in the earth current circuit may be adjusted to have a predetermined gap between the opening and closing of the respective contacts and the reversing switch in the potential pick-up circuit may be adjusted to have an overlap so as to prevent fluctuation in the direct current measuring instrument. The overlap may, for example, be of longer duration than the gap of the switch in the earth current circuit.

The construction is such that a plurality of similar reversing switches may be mounted on the same shaft 31 and may be actuated in unison with the various contact members timed as desired by the adjustable stop members.

Figure 4:
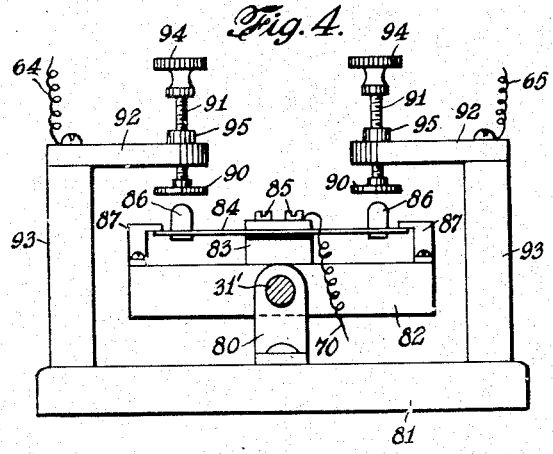
Fig. 4 is an end elevation thereof.

In the embodiment of Figs. 3 and 4 the shaft 31' is shown as mounted in brackets 80 carried by a base 81. The shaft 31' carries a pair of bars 82 of insulating material on each of which is mounted a block 83. Each block 83 carries a leaf spring member 84 which may be attached by screws 85 and carries at its ends contact members 86. Brackets 87, attached to the bar 82 serve as stops to limit the forward movement of the leaf spring 84 and the contacts 86. Adjustable stationary contact members 90 are mounted on rods 91 which are threaded into brackets 92 of conducting material, carried on uprights 93 of insulating material attached to the base 81. Thumb nuts 94 are provided for adjusting the position of the rods 91. Lock nuts 95 secure the rods 91 in adjusted position.

The stationary contacts 90 are cross connected as indicated by lines 96 and are thus connected in pairs to the lines 64 and 65. The contact members 86 are connected to lines 70 and 71 of Fig. 1.

In this embodiment the shaft 31' is rocked by the motor 57 as shown in Fig. 1 and causes the contacts 86 to alternately make and break with the pairs of stationary contacts 90 on opposite sides of the shaft 31, thereby reversing the connections from the lines 64 and 65 to the lines 70 and 71.

Figure 5:
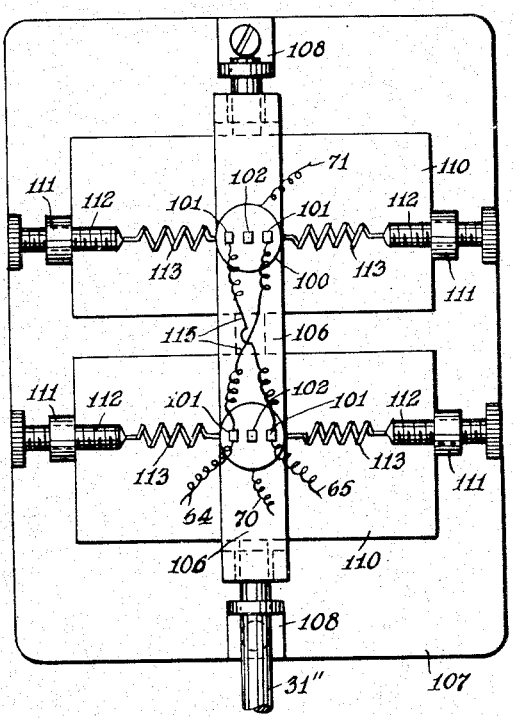
Fig. 5 is a plan view of still another embodiment of the invention.
Figure 6:
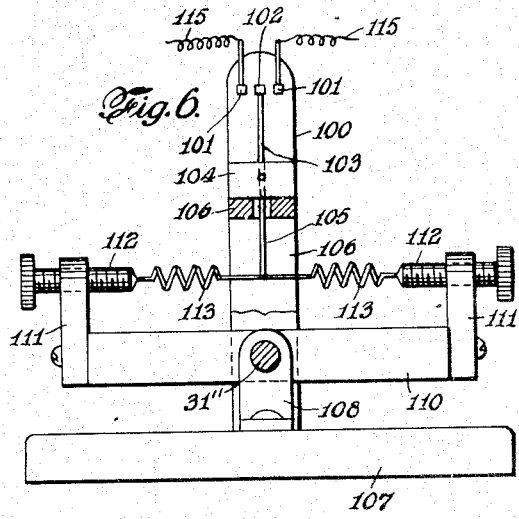
Fig. 6 is an end elevation thereof with parts broken away.

In Figs. 5 and 6 the invention is shown as applied to a pair of vacuum contact switches. In this embodiment a pair of vacuum switches 100 of standard type are shown as having fixed contacts 101 and a movable contact 102 carried on an arm 103 which is pivoted to the base 104 and is actuated by a lever 105. The switches are mounted on a bracket 106 which is secured to a base 107. A shaft 31'' is mounted in brackets 108 attached to the base 107 and carries a pair of cross bars 110. Each bar 110 is provided with end brackets 111 in which adjustable threaded rods 112 are secured. A spring member 113 extends between the rods 112 and is attached at its center to the lever 105. The tension of the spring member 113 may be adjusted as desired by means of the threaded rods 112.

The stationary contacts 101 of the two switches 100 are cross connected as indicated by lines 115 and are thus connected in pairs to lines 64 and 65. The movable contacts are connected to lines 70 and 71.

When the shaft 31'' is rocked the tension of the spring members 113 actuates the levers 105 to cause the movable contacts 102 to engage alternately the fixed contacts 101, thereby reversing the connections between the lines 64 and 65 and the lines 70 and 71.

It is to be noted that all of the above described embodiments are self-centering; that is, midpoint between break and make is unaffected by ordinary wear and use. This is an important advantage when a plurality of such switches are mounted on the same shaft to be operated in synchronism as in the Evjen system above referred to. A plurality of such switches may be adjusted to have different length gaps or overlaps at reversal as described while retaining accurate phase relationships since the various switches may be so set that the mid-points coincide regardless of the make and break timing.

Although certain specific embodiments of the invention have been shown for purposes of illustration, it is to be understood that various changes may be made therein as will readily appear to a person skilled in the art. The invention is only to be limited in accordance with the scope of the following claims.

What is claimed is:

1. A switch comprising an arm having a contact member; a shaft carrying said arm, mechanism connected to rock said shaft at a controlled frequency, a pair of contacts positioned to be engaged respectively by said contact member when said arm rocks in opposite directions, spring means carrying said contacts and arranged to flex in response to the rocking movement of said arm after the respective contacts have been closed, and stop means limiting the return movement of said contacts to thereby cause said contacts to break contact with said contact member at predetermined positions of said arm, said stop members being adjustable for controlling the extent of gap or overlap at reversal.

2. A switch comprising an arm having a contact member providing contacts at opposite sides thereof, a shaft carrying said arm, mechanism connected to rock said shaft at a controlled frequency, a leaf spring mounted on each side of said arm and carrying a contact in a position to engage said first contact in response to rocking movement of said arm and being arranged to flex in response to said rocking movement after the respective contacts have been closed, and stop means limiting the return movement of said leaf spring, to thereby cause said contacts to break contact with said contact member in predetermined positions of said arm, said stop members being adjustable for controlling the extent of gap or overlap at reversal.

3. A switch comprising a shaft, mechanism connected to rock said shaft at a controlled frequency, movable switch contacts, an actuating member therefor, a bracket carried by said shaft to rock therewith, a spring member having its ends secured to said bracket and having an intermediate portion secured to said actuating member to actuate the same as the shaft rocks in opposite directions, and means adjusting the tension of said spring member and the position of said intermediate portion for controlling the make and break timing of said contacts.

4. A reversing switch comprising a shaft, mechanism to rock said shaft from side to side at a controlled frequency, two pairs of stationary contacts, two movable contacts mounted to engage alternately one contact of each of the pairs of stationary contacts, mechanism rocking with said shaft to actuate said movable contacts, resilient means associated with at least one of each pair of cooperating contacts, so that the rocking motion is not impeded after contact is established, and adjustment means to adjust the make and break positions of said cooperating contacts.

HAAKON M. EVJEN.